(12) United States Patent
Ferm et al.

(10) Patent No.: US 6,709,755 B2
(45) Date of Patent: Mar. 23, 2004

(54) METHOD OF PRIMING INORGANIC SUBSTRATES WITH A SILANE-BASED PRIMER COMPOSITION

(75) Inventors: Paul M. Ferm, Morristown, NJ (US); Robert R. Hancock, Jr., Corning, NY (US); Mark A. Lewis, Corning, NY (US)

(73) Assignees: E. I. du Pont de Nemours and Company, Wilmington, DE (US); Corning, Incorporated, Corning, NY (US)

( * ) Notice: Subject to any disclaimer, the term of this patent is extended or adjusted under 35 U.S.C. 154(b) by 65 days.

(21) Appl. No.: 10/032,838

(22) Filed: Oct. 18, 2001

(65) Prior Publication Data

US 2003/0104223 A1 Jun. 5, 2003

(51) Int. Cl.$^7$ ................................. B32B 25/20
(52) U.S. Cl. ................ 428/448; 427/387; 427/508; 428/429; 428/421; 428/451; 428/688; 428/500; 428/447; 528/32; 528/39; 528/41
(58) Field of Search .................. 427/387, 508; 428/429, 421, 448, 451, 688, 500, 447; 528/32, 39, 41

(56) References Cited

U.S. PATENT DOCUMENTS 3,258,388 A * 6/1966 Coleman et al.
4,356,233 A 10/1982 Lange et al.
5,139,601 A 8/1992 Holmes-Farley et al.
5,789,085 A 8/1998 Blohowiak et al.
5,939,197 A 8/1999 Blohowiak et al.
6,183,869 B1 2/2001 Okuda et al.

FOREIGN PATENT DOCUMENTS

EP 0 061 871 B1 10/1984
JP 2000-272045 10/2000

OTHER PUBLICATIONS

Gelest Inc. Catalog, "Supplemental to the Gelest General Catalog: Silicon, Germanium & Tin Compounds, Metal Alkoxides Diketonates and Carboxylates", pp. 29–30, 51–54, 2001.

* cited by examiner

Primary Examiner—Kuo-Liang Peng

(57) ABSTRACT

The present invention is a surface treatment for inorganic substrates, using a primer solution to produce a thin film on a surface of an inorganic substrate thereby extending the shelf life of the inorganic coated substrate and enhancing bonding to a subsequently applied energy curable composition. The coated substrate can be used in a number of commercial applications, e.g., applying a polymer to the coated substrate.

18 Claims, No Drawings

METHOD OF PRIMING INORGANIC SUBSTRATES WITH A SILANE-BASED PRIMER COMPOSITION

FIELD OF THE INVENTION

The present invention relates to a method for priming inorganic substrates, e.g., silicon wafers, to enhance polymer adhesion thereon and improve shelf life and also to layered structures utilizing the same.

BACKGROUND OF THE INVENTION

A polymeric coating applied to an inorganic substrate, without some kind of pre-treatment, often exhibits coating failure in the form of cracking or peeling. Previous methods for preparing a substrate for application of a coating film include subjecting the surface of the inorganic substrate to a chemical composition which contains, for example, phosphoric acid, sulfuric acid, chromic acid, oxalic acid, or other substances known for treating surfaces to improve adhesion; or subjecting the inorganic substrate to surface roughening by sand blasting, shot blasting, grit blasting, honing, paper scratching, wire scratching, hair line finishing, and the like. For purposes of having a clear surface pattern on the substrate, the surface may be subjected to coloring, printing, etching, and the like. All of these methods, however, do not ensure that the film will adequately bind to the surface of the substrate.

Primer compositions are compositions which promote the adhesion of an overcoating to a substrate. A primer layer is a thin layer between a substrate and a coating that serves to bind the two strongly. Many primer compositions are known in the art. Primer compositions are particularly useful for ensuring the formation of strong bonds between an organic substance and an inorganic substrate. The bonds between the organic layer and the priming composition enhance the ability of the inorganic substrate to be coated with a polymeric substance. However, there still remain problems with polymer films adhering sufficiently to the surface of the substrate for long periods of time, and problems with peeling and cracking once the film has been applied.

It is well known in the prior art that organosilanes are useful for promoting the adhesion of organic coatings. For example, Hamada, in European Patent Application EP 82-301396, discloses adhesive primers for bonding silicone rubber to substrates by applying a solution of an organosilane, organic hydroperoxide, and an organic solvent. However, adhesion of the silicone rubber is only achieved by thermocompression.

Lange et al., U.S. Pat. No. 4,356,233, discloses a primer composition for adhering overcoatings derived from in situ polymerization of uncured monomers onto inorganic substrates. However, the primer composition of Lange et al. includes a non-amino or non-amido containing silane and requires the presence of a metal ester.

Holmes-Farley et al., U.S. Pat. No. 5,139,601, is directed to a method for bonding a metal substrate to a similar or dissimilar substrate wherein a primer coating is first applied to the metal substrate surface and the metal substrate is then bonded to the similar or dissimilar substrate with a bonding adhesive. The primer coating used by Holmes-Farley is formed in situ by immersing the substrate in a solution containing 0.0001 to 30 parts by volume of hydrolyzable metal alkoxide, 20–95 parts by weight of solvent and 0.01 to 3 parts by weight of a base and optionally containing a coupling agent. It is noted that suitable adhesion occurs only when both the tetraalkoxysilane and aminosilane are present in the priming composition.

There remains a need for a method for priming inorganic substrates wherein the applied primer film has good shelf life and promotes adhesion of subsequently applied layers of fluorinated materials. In addition, there remains a need for a coated substrate that has improved shelf-life which can be stored and transported without loss of its adhesion-promoting characteristics.

SUMMARY OF THE INVENTION

The present invention is directed to a primer composition comprising: a diluent silane compound of formula (I):

$$R_d Si(OR_1)(OR_2)(OR_3) \quad \text{(I)}$$

wherein $R_d$ comprises a non-polymerizable moiety; and $R_1$, $R_2$, and $R_3$ are independently selected from the group consisting of H, halogen, $C_1$ to $C_{10}$ alkyl, $C_6$ to $C_{14}$ aryl, and a silicate network;

and a free radical-polymerizable silane compound of formula (II):

$$R_e Si(OR_4)(OR_5)(OR_6) \quad \text{(II)}$$

wherein $R_e$ comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network;

wherein the mole ratio of diluent silane to free radical polymerizable silane is between 1:9 and 9:1, preferably 1:3 and 3:1, or most preferably 1:2 and 2:1, and the composition optionally comprises a solvent.

In one embodiment of the invention, $R_d$ is selected from the group consisting of hydroxide, halide, $C_1$ to $C_{10}$ alkoxy, $C_1$ to $C_{10}$ aryloxy, and a silicate network. In another embodiment of the invention, $R_d$ is selected from the group consisting of alkyl, aryl, alkaryl, cycloalkyl, heteroaryl, fluoroalkyl, fluoroaryl, alkoxy, nitro, halo, amide, and ester. In another embodiment of the invention, $R_d$ comprises a moiety selected from the group consisting of amino, alkylamino, dialkylamino and trialkylamino.

Another aspect of the invention is directed to a process for priming an inorganic substrate comprising the steps of applying to the surface of the substrate a thin film of a primer composition comprising a diluent silane compound of formula (I):

$$R_d Si(OR_1)(OR_2)(OR_3) \quad \text{(I)}$$

wherein $R_d$ comprises an organic non-polymerizable moiety, and $R_1$, $R_2$, and $R_3$ are independently selected from the group consisting of H, halogen, $C_1$ to $C_{10}$ alkyl, $C_6$ to $C_{14}$ aryl, and a silicate network; and a free radical-polymerizable silane compound of formula (II)

$$R_e Si(OR_4)(OR_5)(OR_6) \quad \text{(II)}$$

wherein $R_e$ comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network; wherein the mole ratio of diluent silane to free radical polymerizable silane is between 1:9 and 9:1, preferably 1:3 and 3:1, or most preferably 1:2 and 2:1; and at least partially condensing the silanes to form a silicate network, thereby forming a primed substrate having a condensed primer layer covalently bonded to the substrate. The condensed primer layer has reactive polymerizable moieties available for copolymerization with a subsequently applied material. The composition can be applied by many methods, for example, by spin-coating, immersing, drenching, spraying and precipitating. Partial condensation of the silanes can occur by baking the thin film of the composition. In a preferred aspect of the process for priming the inorganic substrate, the silanes of the primer composition have been at least partially condensed to form a sol.

In one embodiment of the invention, the inorganic substrate is a silicon wafer. One aspect of this embodiment relates to a silicon wafer that comprises a layer of silicon dioxide, to which the thin film of the primer composition is applied. Application of the primer composition results in a primer layer having a thickness of about 30 Å to about 2 μm, and is preferably between about 30 Å and about 300 Å.

Another embodiment of the invention relates to a process for forming a polymer layer on an inorganic substrate which includes applying to the surface of the substrate a thin film of a primer composition which includes a diluent silane compound of formula (I):

wherein $R_d$ comprises an organic non-polymerizable moiety, and $R_1$, $R_2$, and $R_3$ are independently selected from the group consisting of H, halogen, $C_1$ to $C_{10}$ alkyl, $C_6$ to $C_{14}$ aryl, and a silicate network; and a free radical-polymerizable silane compound of formula (II):

wherein $R_e$ comprises a free radical-polymerizable moiety; $R_4$, $R_5$ and $R_6$ are independently selected from the group consisting of H, halogen, $C_1$ to $C_{10}$ alkyl, $C_6$ to $C_{14}$ aryl, and a silicate network; wherein the mole ratio of diluent silane to free radical polymerizable silane is between 1:9 and 9:1, preferably 1:3 and 3:1, or most preferably 1:2 and 2:1. The process further includes at least partially condensing the silanes to form a silicate network, thereby forming a condensed primer layer having reactive polymerizable moieties; applying to the surface of the primer layer an energy curable composition; and polymerizing the energy curable polymerizable composition, thereby forming a polymer layer. In a preferred aspect of the process for forming a polymer layer on the inorganic substrate, the polymer layer forms covalent bonds with the primer layer. Applying the primer composition to the substrate or applying the energy curable composition to the primed substrate can be achieved by several methods such as, for example, spin-coating, immersing, drenching, spraying and precipitating.

In a preferred aspect of the process for forming a polymer layer on an inorganic substrate, the energy curable composition includes a free radical-polymerizable monomer or oligomer and a free radical initiator. In a particularly preferred aspect, the free radical initiator is a photoinitiator and the energy curable composition is polymerized by exposure to actinic radiation. The energy curable composition may include any composition having a moiety which can undergo polymerization, and includes such compounds as highly fluorinated acrylates.

Yet another embodiment of the invention relates to a layered structure which includes: (a) an inorganic substrate and (b) an at least partially condensed primer layer deposited on the substrate, the primer layer comprising:

a diluent silane compound of formula (I):

wherein $R_d$ comprises an organic non-polymerizable moiety, and $R_1$, $R_2$, and $R_3$ are independently selected from the group consisting of H, halogen, $C_1$ to $C_{10}$ alkyl, $C_6$ to $C_{14}$ aryl, and a silicate network;

and a free radical-polymerizable silane compound of formula (II):

wherein $R_e$ comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network; wherein the mole ratio of diluent silane to free radical polymerizable silane is between 1:9 and 9:1, preferably 1:3 and 3:1, or most preferably 1:2 and 2:1, and optionally (c) an energy curable composition.

DETAILED DESCRIPTION OF THE INVENTION

This invention is directed to a primer composition which exhibits increased shelf-life in comparison to prior primer compositions known in the art. It was the present inventors' discovery that primer compositions and methods of priming in the prior art failed to produce a primed substrate that could be stored for greater than 1 days, or even greater than 3 days. It was also the present inventors' endeavors which ultimately obtained a primer composition that, upon application to a substrate, provided excellent adhesion for fluorinated energy curable compositions.

According to one embodiment of the present invention, a diluent silane is hydrolyzed and partially condensed in a solution along with a free radical-polymerizable silane compound, thereby forming a composition of an oligomeric structure in solution containing many reacted diluent silanes and free radical-polymerizable silane molecules. As the skilled artisan will recognize, this solution is a sol. The resultant composition is applied to form a thin layer, preferably having a thickness of between about 30 Å and 2 μm, more preferably between about 30 Å and 300 Å on the surface of an inorganic substrate. The primer coated substrate is then baked to condense the silanol groups, leaving unreacted free-radical polymerizable moieties in a matrix on the surface of the substrate. This method of priming provides a multi-layer network of reactive polymerizable moieties which are formed on the surface of the substrate, allowing for a greater number of bonds per unit area. Application of the primer composition uses known techniques where film thickness can be controlled and monitored. Because the material can be heated shortly thereafter to condense the film, rapid manufacturing methods can be employed, for example, spin coating and baking. The use of a diluent silane in the primer composition provides that the reactive polymerizable moieties are sufficiently separated from one another, thereby preventing cross-linking of primer molecules to one another, hence increasing the cross-linking between primer and the energy curable composition which is subsequently applied.

In one embodiment of the present invention, the primed substrate is coated with highly fluorinated polymers to make an integrated optic waveguide. The use of fluorinated polymers in certain optical products achieves lower optical losses than the use of the corresponding non-fluorinated polymers. Suitable polymeric materials are described in commonly owned and copending U.S. patent application Ser. No.09/337,337, filed Jun. 21, 1999, which is incorporated herein by reference in its entirety. A suitable waveguide fabrication process is detailed in commonly owned and copending U.S. patent application Ser. No. 09/846,697, filed May 1, 2001, which is incorporated herein by reference in its entirety.

The present inventors have discovered that by diluting the free radical polymerizable moieties with unreactive moieties, and thus preventing reaction of primer layer free-radical polymerizable moieties with one another, the shelf-life of the coated substrate is extended. While not being bound to any one theory, it is believed that where reactive moieties are close together, inadvertant initiation of one leads to a chain reaction of many. In contrast, if the reactive moieties are sufficiently distanced one from another, initiation of one only destroys one, thereby preventing complete self-reaction of the primer layer. The prevention of primer self-reaction provides a substrate that survives storage with a substantial fraction of its reactive polymerizable moieties intact. Such a substrate has an improved adhesion to an energy curable composition cured in contact with the substrate.

The present invention relates to a primer composition comprising a diluent silane and a free radical-polymerizable silane in specific proportions for application to inorganic substrates. The purpose of the diluent silane is to dilute the free radical-polymerizable silane. The diluent silane has a structure of formula (I):

$$R_d Si(OR_1)(OR_2)(OR_3) \tag{I}$$

and the free radical-polymerizable silane has a structure of formula (II):

$$R_e Si(OR_4)(OR_5)(OR_6) \tag{II}$$

$R_d$ comprises an organic non-polymerizable moiety. The organic non-polymerizable moiety may be any moiety that is not polymerizable by a free-radical initiator. For example, $R_d$ may be hydroxy, halo, $C_1$ to $C_{10}$ alkoxy, $C_1$ to $C_{10}$ aryloxy, alkyl, aryl, alkaryl, cycloalkyl, heteroaryl, haloalkyl, alkoxy, nitro, halo, —C(O)—NR'$_2$ (wherein R' is hydrogen, $C_1$ to $C_{10}$ alkyl or $C_1$ to $C_{10}$ alkoxy), or —C(O) OR" (wherein R" is H, $C_1$ to $C_{10}$ alkyl, amino, alkylamino, dialkylamino or trialkylamino). In some cases, the composition may be partially derived from a tetrafunctional silane such as tetraethyl orthosilicate; in such cases, $R_d$ may also be a silicate network. As used herein, a silicate network is a structure having Si—O—Si bonds. Silicate networks are known by the skilled artisan to be the products of hydrolysis and condensation of alkoxysilanes. $R_d$ can be a fluorinated moiety so that the surface energy of the primer layer matches the surface energy of a fluorinated energy curable composition. For example, $R_d$ can include a perfluoroalkyl or perfluoroaryl moiety. $R_1$, $R_2$ and $R_3$ are groups that define moieties of the diluent silane and its hydrolysis products, and are independently chosen from the group consisting of H, halogen, $C_1$ to $C_{10}$ alkyl, $C_6$ to $C_{14}$ aryl, and a silicate network, wherein the silicate network encompasses silanes of formulae (I) and (II) which are hydrolyzed and condensed in a sol-gel process, e.g., $(R_d SiO_{1.5})_m$—$(R_e SiO_{1.5})_m$. One preferred diluent silane is 3-aminopropyltriethoxysilane.

The free radical-polymerizable silane compound of formula (II) comprises the variable moiety $R_e$, which is a free radical-polymerizable moiety. Thus, the $R_e$ moiety will undergo polymerization in the presence of a polymer initiator, e.g., a free radical initiator. $R_e$ is selected from moieties which are co-polymerizable with the energy curable composition that is subsequently applied to the surface of the primer layer. Preferably, the free radical-polymerizable moiety includes an ethylenically unsaturated moiety. An ethylenically unsaturated moiety includes a carbon chain of at least two carbons having at least one C═C functionality which can be substituted or unsubstituted. Examples of ethylenically unsaturated moieties useful in this invention include, but are not limited to, acrylate, methacrylate, vinyl ether, styryl, allyl, maleimide, maleate ester and furmarate ester. The substituent groups $R_4$, $R_5$ and $R_6$ are groups that define moieties of the free radical polymerizable silane compound and its hydrolysis products and are independently selected from the group consisting of H, halogen, $C_1$ to $C_{10}$ alkyl, $C_6$ to $C_{14}$ aryl, and a silicate network.

Alkyl moieties include $C_1$ to $C_{10}$ branched or linear alkyl groups, e.g., a methyl group, an ethyl group, a propyl group, a butyl group, a hexyl group, an octyl group or a halogenated or deuterated alkyl group. Aryl moieties include $C_6$ to $C_{14}$ aromatic ring structures, e.g., a phenyl group, a tolyl group, a xylyl group, a naphthyl group, a biphenyl group, a deuterated aryl group or a halogenated aryl group. Alkaryl moieties include aromatic rings bonded to a divalent alkyl chain which attaches to Si, e.g., a benzyl group, a phenylethyl group and similar groups. Cycloalkyl moieties include $C_3$ to $C_{10}$ monocyclic or polycyclic cycloalkyl groups, e.g., a cyclopentyl, a cyclohexyl group or a tetrahydronaphthyl group. Heteroaryl moieties include mono- or polycyclic unsaturated heterocyclic groups comprising one or more hetero atoms selected from the group consisting of N, O and S which may be the same or different from each other. Haloalkyl moieties include fluorinated, brominated or iodinated linear or branched $C_1$ to $C_{10}$ alkyl, e.g., —CF$_3$, CH$_2$CBr$_3$ and the like. Alkoxy moieties include $C_1$ to $C_{10}$ branched or linear alkoxy groups, e.g., a methoxy group, an ethoxy group, a propoxy group, a butoxy group, a hexyloxy group, an octyloxy group or a deuterated alkoxy group. Halogen (halo) moieties include fluorine (fluoro), bromine (bromo), or iodine (iodo).

The primer composition of the invention is typically applied to an inorganic substrate. Examples of such inorganic substrates include, but are not limited to, silicon, glass, and ceramics. Further examples include, but are not limited to, gallium arsenide, complex semiconductor substrates and silicon on insulator materials. It is also possible that the primer composition can be applied to a coated inorganic substrate, e.g., a silicon wafer having a silicon dioxide layer deposited thereon or native thereto. In addition to being essentially planar, suitable substrates include but are not limited to particles, fibers, filaments, wafers and the like having an oxide layer.

One embodiment of the primer composition comprises a solvent. The solvent of choice may be an organic solvent which does not interfere with silane hydrolysis. Therefore a solvent such as aqueous ethanol, isopropyl alcohol (IPA), tetrahydrofuran and the like would be suitable for use in the primer composition.

As the person of skill in the art will recognize, the primer composition may also include an acid or base catalyst to accelerate the hydrolysis and condensation of the silanes. For example, the composition may include hydrochloric acid, acetic acid, sulfuric acid, sodium hydroxide, or ammonium hydroxide. When the diluent silane includes an acidic or basic moiety, such as in 3-aminopropyltriethoxysilane, the silane itself can provide catalytic activity, and the use of a separate catalyst is not needed.

In the primer composition, the mole ratio of diluent silane to free radical polymerizable silane is between 1:9 and 9:1, preferably 1:3 and 3:1, or most preferably 1:2 and 2:1. Not wishing to be bound to any one theory, the mole ratio relates to the inventive concept that separation of the reactive polymerizable moieties with a diluent silane inhibits or prevents reactions of the primer layer's unsaturated moieties with one another, thereby extending the shelf-life of the coated substrate and ultimately enhancing bonding between the primer composition and a subsequently applied energy curable composition. The more diluent silane present, the lower the volume density of the energy curable moiety.

The reactive polymerizable moieties may include any moiety which can co-polymerize with a subsequently applied energy curable composition. Examples of such reactive polymerizable moieties include ethylenically unsaturated moieties such as, for example, alkenyl, styrenyl, methacryloyl, acryloyl, allyl, and vinyl.

The primer compositions can consist of unhydrolyzed alkoxysilanes. Alternatively, the silanes of the primer composition may be partially or substantially hydrolyzed, and/or partially or substantially condensed. For example, the silanes may be hydrolyzed and partially condensed to form a sol.

Depending upon the degree of hydrolysis and/or condensation of the silanes, more or less baking to condense the primer layer will be necessary. For example, a primer layer deposited from partially hydrolyzed, uncondensed primer composition will need to be baked longer than a primer layer deposited from a fully hydrolyzed, partially condensed sol.

The present invention also relates to a process for priming an inorganic substrate. The process involves applying to a surface of the inorganic substrate a thin film of the primer composition. After application of the primer composition, the silanes are at least partially condensed to form a silicate network, thereby forming a primed substrate having a condensed primer layer covalently bonded to the substrate having reactive polymerizable moieties on the surface of the primer layer.

Application of the primer composition to the inorganic substrate may be accomplished by any method whereby an even, uniform thickness of the primer composition is achieved. Examples of application techniques include, but are not limited to, spin-coating, immersing, drenching, spraying and precipitating. These application techniques can provide an application thickness on the substrate in the range of about 30 Å to 2 $\mu$m, and preferably between about 30 Å and 300 Å. As the person of skill in the art will recognize, any solvent that will evaporate upon application as a thin layer can be used as in practicing the invention.

In the process for priming the inorganic substrate, the thin layer of the diluent silane and the free radical polymerizable silane are at least partially condensed to form a silicate network. The process of condensing may include baking the thin layer of the primer composition at temperatures between about 70–140° C. for up to about two hours. For example, the primed substrate may be baked at 120° C. for 30 minutes. As the skilled artisan will recognize, other baking times and temperatures may be used to yield the primed substrate. Even though it is preferable that the diluent silane and the free radical polymerizable silane completely condense to form a silicate network, partial condensation, where some silanes do not condense, is also contemplated. It is recognized that one skilled in the art would be able to perform other conventional methods for priming the surface with the mixture of silanes of formulae (I) and (II).

The reaction mechanism of the substrate with the silanes involves reaction between the hydroxyl moieties on the substrate which react with the silanes to form M—O—Si moieties. When a silicon based substrate is used, M is Si.

One aspect of the invention relates to the formation of a sol wherein the diluent silane and the free radical polymerizable silane condense in solution to form a sol. A sol is formed as an intermediate in a sol-gel process which is a method for preparing metal oxides by hydrolyzing a chemical precursor or mixture of chemical precursors that pass sequentially through a solution state, a sol state and a gel state before being dehydrated to a final product. The first step in preparing a sol is partial hydrolysis of metal alkoxides to form reactive monomers, followed by polycondensation of the formed monomers to form colloid-like oligomers, thereby forming the sol.

Another aspect of the invention relates to a process for forming a polymer layer on an inorganic substrate. First, the inorganic substrate is primed as set forth above. The process of priming involves applying a thin film of the primer composition as set forth above to the inorganic substrate, then at least partially condensing the diluent silane and the free radical polymerizable silane to form a silicate network, thereby forming a condensed primer layer having reactive polymerizable moieties on the substrate. The next step involves applying to the surface of the primer layer at least one energy curable composition. The next step includes polymerizing the energy curable composition to form a polymer layer. The polymerization of the energy curable composition typically results in covalent bonds between the polymer layer and the primer layer.

An energy curable composition includes any type of composition which can polymerize upon application of an energy source, e.g., actinic radiation (UV, X-ray and the like), heat and electron beam. One example of an energy curable composition contains a free radical polymerizable monomer or oligomer and an appropriate free radical initiator. Examples of energy curable compositions, include but are not limited to, adhesives, UV-curable coatings and negative photoresists. Specific examples of free radical polymerizable monomers and oligomers include, but are not limited to, perfluorinated polyether acrylates and fluorinated acrylates, such as those disclosed in U.S. patent application Ser. No. 09/337,337. Specific substances include, for example, 2,2,3,3,4,4,-octafluorohexane-1,6-diyl diacrylate, and diacrylate-terminated poly(tetrafluoroethylene oxide).

The present invention also relates to a layered structure which comprises an inorganic substrate layer including the primer composition set forth above and optionally including at least one cured polymeric material derived from an energy curable composition. This aspect of the invention includes products such as a silicon wafer having a primer layer which is subsequently coated with at least one energy curable composition which has been cured to covalently bond with the primer layer. In a preferred aspect of the invention, the cured polymeric material is a highly fluorinated compositions such as those described in U.S. patent application Ser. No. 09/337,337. Examples of such layered structures include but are not limited to, integrated optic waveguides and AR (anti-reflective) coatings.

The primed wafers of the present invention have a shelf life of greater than 1 day, or even greater than about 3 days. As used herein, a shelf life of greater than 1 or 3 days means that the reactive polymerizable moieties of the primer layer are substantially unreacted after storage at room temperature for 1 or 3 days. Since the reactive polymerizable moieties are substantially unreacted (e.g. greater than 50% unreacted), the stored primer layer can form strong bonds to subsequently applied energy curable compositions.

The following examples are given to illustrate the present invention. It should be understood, however, that the invention is not to be limited to the specific conditions or details described in these examples. Throughout the specification, any and all references to a publicly available documents are specifically incorporated into this patent application by reference.

EXAMPLES

Example 1

In this example, application of a thin film of the primer composition was tested to show that if promotes adhesion between a silicon wafer and a fluoropolymer.

(a) Preparation of the primer composition: In a 50 mL round-bottom flask, 4.25 mL isopropyl alcohol (IPA), 0.17 mL 4M HCl, and 2.23 mL tetraethoxysilane (TEOS, purchased from Gelest, Inc.) were stirred for 1 hour in a hot water bath at 55° C. A 0.056 mL aliquot of $H_2O$ was added. Thirty seconds later, 2.35 mL acryloxypropyltrimethoxysilane (APTMS, purchased from Gelest, Inc.) and 0.056 mL $H_2O$ were added, and the mixture was stirred for 30 minutes at 55° C. Next, 0.225 mL $H_2O$ and 0.75 mL mesitylene (purchased from Aldrich, Inc.) were added and the reaction mixture was stirred for 4 hours at 55° C.

(b) Wafer Preparation: The silicon wafers (supplied by WaferNet, Inc.) were cleaned for 1 hour in 4M NaOH or 1M HCl, rinsed for 30 minutes under running deionized (DI) water, baked for 1 hour at 100° C. and $O_2$ plasma cleaned for 15 minutes at 200 Watts with 1 Torr $O_2$ ($O_2$ plasma cleaner of Branson/IPC 3000 series Plasma Reactor).

(c) Primer Coating: The wafers of step (b) were spin-coated with the primer composition obtained in step (a) by spinning at 1250 rpm for 60 seconds. The coated wafers were then baked on a hotplate for 30 minutes at 120° C.

(d) Energy Curable Composition Application: 1 mL of fluorinated acrylate energy curable composition containing 24% of Fluorolink T (a tetracrylate of tetrafunctional perfluoropolyether MW=2800 available from Ausimont), 74% Fluorolink D2 (a diacrylate of a difunctional perfluoropolyether MW=4000 available from Ausimont), and 2% fluorinated photoinitiator (described in U.S. Reissue Pat. No. 35,060) was dispensed onto a wafer from step (c). The wafer was spun at 1300 rpm for 20 seconds to create a 10 μm thick layer of the energy curable composition. The sample was then cured under a nitrogen atmosphere using a mercury arc lamp. This UV radiation source has an intensity of 15 mW/cm² at a wavelength of 365 nm. A total dose of 4.5 J/cm² was given. The exact dosage can be varied substantially at any value >0.5 J/cm². The sample was then annealed at 100° C. for 3 hours. The annealing step is used to ensure full cure of the primer layer and to evaporate any remaining volatile components. It is meant only to ensure the material is sufficiently polymerized to be dry to the touch and that it has reacted with the acrylate end groups contained within the primer layer.

Table 1 indicates the wafers exhibited excellent adhesion when primed 2 and 11 days before application of fluoropolymer. As can be seen from the Table, after exposure to 85/85 (humidity/temperature), 3 of the 4 wafers still exhibited excellent adhesion. Adhesion strength is based on a scale of 0–5 with 5 being the highest observed adhesive strength. Testing can be carried out in many ways and usually includes scratching or cutting, and can be followed by a peel-test using an adhesive tape (e.g. Scotch® brand transparent tape), and can also include microscopic examination of the tested region. In this example, a scratch and tape test was carried out. If the sample passes this test, a more aggressive test is performed which involves cutting through the polymer coated silicon wafer with a dicing saw. The dicing saw was a thin 4" diameter resinoid blade with embedded diamond fragments. The blade rotates at high speeds (20,000 rpm). After dicing, the polymer surface was rinsed and blown dry. After dicing the edge was examined under 100× to 200× microscopy. Since the polymer adheres well enough to remain on the silicon after dicing, the polymer film can be seen to rest directly over the cut edge of the silicon wafer. If the blade causes delamination, one may see polymer regions completely removed from the silicon. More often, the polymer remains, but is not adhering to the silicon. Between the silicon and the polymer, a small air gap is created which gives rise to an interference effect under visible light microscopy. This interference pattern is often ring shaped and is known as Newton rings. The silicon pieces were then rated on the following scale:

0=sample delaminated before scratch-tape test;

1=scratch test squares totally delaminated after tape pull;

2=some scratch test squares delaminated after tape test;

3=no scratch test squares delaminated after tape test, but after dicing test, a long continuous band of Newton Rings are seen under a 100× to 200× microscope;

4=no scratch test squares delaminate after tape test and after dicing test only as few small regions of Newton Rings are seen under 100× to 200× microscope;

5=no failed under scratch tape test and no Newton Rings observed under 100× to 200× microscopy after dicing.

These results also indicate that the preferred method of cleaning is NaOH.

TABLE 1

| Coated wafers composition of example 1 (324 second exposure) | | | |
|---|---|---|---|
| Cleaning Method | Sample | Dwell Time (days) | Adhesion | After 85/85 Adhesion |
| NaOH | 1 | 11 | 5 | 5 |
|  | 2 | 2 | 5 | 5 |
| HCl | 1 | 11 | 5 | 1 |
|  | 2 | 2 | 5 | 5 |

Example 2

This example shows the effect of cleaning methods for silicon wafers and determined if different spinning rates affect adhesion. This example also provides data about the aging of the primer solutions.

(a) Preparation of the primer composition: the primer composition for Example 2 was prepared in the same manner as Example 1(a). Wafers A-D were coated with freshly prepared primer composition and wafer E was coated with the previously prepared primer composition.

(b) Wafer preparation: Wafers A and B were cleaned for 1 hour in 4M NaOH, rinsed in DI water for 30 minutes, baked for 1 hour at 100° C. and then UV/ozone cleaned for 30 minutes (UV/Ozone cleaner of UVOCS Ultra-Violet Ozone Cleaning System). Wafers C and D were cleaned for 1 hour in 4M NaOH, rinsed in DI water for 30 minutes, baked for 1 hour at 100° C. and then $O_2$ plasma cleaned for 15 minutes. Wafer E was cleaned for 1 hour in 4M NaOH, rinsed in DI water for 30 minutes, baked for 1 hour at 100° C. and then $O_2$ plasma cleaned for 15 minutes.

(c) Primer coating: Wafer A was spin-coated with the primer composition prepared in the present example [step(a)] by spinning at 1250 rpm for 60 seconds. Wafer B was spin-coated with the primer composition prepared in present example [step(a)] by spinning at 2500 rpm for 60 seconds. Wafer C was spin-coated with the primer composition prepared in the present example [step(a)] by spinning at 1250 rpm for 60 seconds. Wafer D was spin-coated with the primer composition prepared in the present example [step(a)] by spinning at 2500 rpm for 60 seconds. Wafer E was spin-coated with the primer composition of Example 1 [step(a)] by spinning at 2500 rpm for 60 seconds. The coated wafers were then baked on a hotplate for 30 minutes at 120° C.

(d) Energy Curable Composition Application: The fluorinated acrylate energy curable composition described in Example 1(d) was applied by the same coating and curing process described in Example 1(b).

Table 2 shows results which indicate that the wafers exhibited adhesive failure at both the primer composition wafer interface and the adhesive composition interface.

In addition, both Newton rings and complete ripping away of layers were visible. The cosmetic descriptions indicate quality of the primer coating, both before and after application of adhesive. The cosmetics include spots and streaks which can render the adhesive coating unacceptable.

| | | Coated wafers with UV110 Buffer (336 s exp.) | | |
|---|---|---|---|---|
| | | 1 = bad, 2 = OK, 3 = good | | |
| | days | Cosmetics After priming | Post Cosmetics After adhesive application | Adhesion |
| A | 1 | 1 | 1 | 3 |
| B | 1 | 2 | 2 | 2 |
| C | 1 | 1* | 2 | 3 |
| D | 1 | 2 | 2 | 3 |
| E | 1 | 2 | 2 | 5 |

*patches of cracks

The results of this example indicate that $O_2$ plasma cleaning is preferred over UV/ozone cleaning.

Example 3

This experiment determined whether spin time affected adhesion and compared two different primer compositions.

(a) Preparation of primer composition 1: In a 50 mL round-bottom flask 4.25 mL IPA, 0.17 mL HCl/$H_2O$ (2.2 mL conc. HCl in 4.5 mL $H_2O$), 2.23 mL tetraethoxysilane (TEOS) were stirred for 1 hour in a hot water bath at 55° C. Next, a 0.056 mL aliquot of $H_2O$ was added, followed thirty seconds later by 2.35 mL acryloxypropyltrimethoxysilane (APTMS) and 0.056 mL $H_2O$. The mixture was stirred at 55° C. for thirty minutes. Then 0.225 mL $H_2O$ and 0.75 mL mesitylene were added and the reaction mixture was stirred for 4 hours at 55° C.

(b) Preparation of primer composition 2: In a 50 mL centrifuge tube a mixture of 2.23 mL TEOS, 5.73 mL ethanol and 0.09 mL conc. HCl in 0.09 mL $H_2O$ was allowed to react for 1 hour with occasional mixing by shaking. Then 2.35 mL acryloxypropyltrimethoxysilane (APTMS) was added and allowed to react for 1 hour with occasional mixing by shaking. A 0.17 mL aliquot of $H_2O$ was added, which was allowed to react at room temperature for 2 hours with occasional mixing by shaking.

(c) Wafer preparation: The wafers were cleaned for 1 hour in 4M NaOH, rinsed in deionized water for 30 minutes, baked for 1 hour at 100° C., then $O_2$ plasma cleaned for 15 minutes.

(d) Primer coating: Wafer F was spin-coated with primer composition 1 prepared in the present example by spinning at 1500 rpm for 60 seconds. Wafer G was spin-coated with primer composition 1 prepared in the present example by spinning at 1500 rpm for 120 seconds. Wafer H was spin-coated with primer composition 2 prepared in the present example by spinning at 1500 rpm for 60 seconds. Wafer I was spin-coated the primer composition 2 prepared in the present example by spinning at 1500 rpm for 120 seconds. The coated wafers were then baked on a hotplate for 30 minutes at 120° C.

(e) Energy Curable Composition Application: The fluorinated acrylate formulation described in Example 1(d) was applied by the same coating and curing process described in Example 1(b).

Table 3 shows results which indicate that while adhesion using primer composition 2 is acceptable, the cosmetics using a substrate having a thin film of primer composition 1 was slightly better. This example set forth 2 conditions each repeated twice. The cosmetic results indicate some variability in the cosmetic quality of the primer coatings prepared with this technique. It was observed that spin time does not improve cosmetics. The adhesion results show some variability of adhesion with some indicating poor adhesion.

TABLE 3

| | | | Cosmetics: 1 = bad, 2 = OK, 3 = good | | |
|---|---|---|---|---|---|
| Sample | RPM | Time | Cosmetics After priming | Post Cosmetics After adhesive application | Adhesion |
| F | 1500 | 60 s | 2 | 2 | 1 |
| G | 1500 | 120 s | 2 | 2 | 2 |
| H | 1500 | 60 s | 1 | 1 | 4 |
| I | 1500 | 120 s | 1 | 1 | 3 |

Example 4

This example shows the primer layer thickness after application of the 2% diluted primer composition when applied at different spin rates.

Table 4 shows the different spin rates with the corresponding layer thickness of each sample in Ångstroms with standard deviations listed. The layers were measured using a Gaertner Scientific Ellipsometer. Measurements were taken by measuring the difference of the 5000 Å oxide layer before and after primer layer deposition.

TABLE 4

| | |
|---|---|
| 2% Primer composition in THF - 1000 rpm | |
| Average | 246.79 |
| Standard Deviation | 8.52 |
| 2% Primer composition in THF - 2000 rpm | |
| Average | 246.43 |
| Standard Deviation | 1.57 |
| 2% Primer composition in THF - 2500 rpm | |
| Average | 158.09 |
| Standard Deviation | 2.59 |
| 2% Primer composition in IPA - 1000 rpm | |
| Average | 209.80 |
| Standard Deviation | 2.89 |
| 2% Primer composition in IPA - 2000 rpm | |
| Average | 208.67 |
| Standard Deviation | 2.50 |
| 2% Primer composition in IPA - 2500 rpm | |
| Average | 130.61 |
| Standard Deviation | 2.63 |
| 0.5% Primer composition in IPA - 1000 rpm | |
| Average | 74.96 |
| Standard Deviation | 0.62 |
| 0.5% Primer composition in IPA - 2000 rpm | |
| Average | 57.92 |
| Standard Deviation | 0.80 |
| 0.5% Primer composition in IPA - 2500 rpm | |
| Average | 50.35 |
| Standard Deviation | 0.94 |
| 0.1% Primer composition in IPA - 1000 rpm | |
| Average | 31.62 |
| Standard Deviation | 0.62 |
| 0.1% Primer composition in IPA - 2000 rpm | |
| Average | 24.62 |
| Standard Deviation | 0.96 |
| 0.1% Primer composition in IPA - 2500 rpm | |
| Average | 23.20 |
| Standard Deviation | 0.48 |

Example 5

This example shows the primer layer thickness after application of the primer composition at the indicated molar ratios when applied at spin rates of 1000 rpms and 1500 rpms.

Table 5 shows the different spin rates with the corresponding layer thickness of each sample in Ångstroms with standard deviations listed. The layers were measured using a Gaertner Scientific Ellipsometer.

TABLE 5

| | |
|---|---|
| 50/50 APTMS/TEOS - 1000 rpm | |
| Average | 33.07 |
| Standard Deviation | 0.68 |
| 50/50 APTMS/TEOS - 1500 rpm | |
| Average | 28.36 |
| Standard Deviation | 0.84 |
| 60/40 APTMS/TEOS - 1000 rpm | |
| Average | 32.44 |
| Standard Deviation | 0.49 |
| 60/40 APTMS/TEOS - 1500 rpm | |
| Average | 27.88 |
| Standard Deviation | 0.52 |
| 70/30 APTMS/TEOS - 1000 rpm | |
| Average | 33.50 |
| Standard Deviation | 0.82 |
| 70/30 APTMS/TEOS - 1500 rpm | |
| Average | 28.35 |
| Standard Deviation | 0.35 |
| 80/20 APTMS/TEOS - 1000 rpm | |

TABLE 5-continued

| | |
|---|---|
| Average | 32.85 |
| Standard Deviation | 0.42 |
| 80/20 APTMS/TEOS - 1500 rpm | |
| Average | 28.42 |
| Standard Deviation | 0.40 |
| 95/5 APTMS/TEOS - 1000 rpm | |
| Average | 32.82 |
| Standard Deviation | 0.53 |
| 95/5 APTMS/TEOS - 10500 rpm | |
| Average | 27.89 |
| Standard Deviation | 0.35 |

The significance of these results is that layer (priming) thickness can be controlled over wide range (~30 Å-1 μm).

Although the invention has been described above in detail for the purpose of illustration, it is understood that numerous variations and alterations may be made by the skilled artisan without departing from the spirit and scope of the invention defined by the following claims.

What is claimed is:

1. A process for priming a silicone wafer substrate comprising the steps of:

applying to the surface of the substrate a thin film of a primer composition comprising a diluent silane compound of formula (I):

$$R_d Si(OR_1)(OR_2)(OR_3) \qquad (I)$$

wherein $R_d$ comprises an organic moiety, and $R_1$, $R_2$, and $R_3$ are independently selected from the group consisting of H, halogen, $C_1$ to $C_{10}$ alkyl, $C_6$ to $C_{14}$ aryl, and a silicate network;

and a free radical-polymerizable silane compound of formula (II):

$$R_e Si(OR_4)(OR_5)(OR_6) \qquad (II)$$

wherein $R_e$ comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network;

wherein the mole ratio of diluent silane to free radical polymerizable silane is between 1:9 and 9:1; and at least partially condensing the diluent silane and the free radical polymerizable silane to form a silicate network, thereby forming a primed substrate having a condensed primer layer covalently bonded to the substrate, the surface of the primer layer having reactive free radical polymerizable moieties.

2. The process of claim 1, wherein the step of at least partially condensing the silanes is performed by heating at a temperature between about 70° C. and about 140° C. for up to about 2 hours.

3. The process of claim 1, wherein the silicon wafer further comprises a layer of silicon dioxide, and the thin film of the primer composition is applied to the surface of the silicon dioxide.

4. The process of claim 1, wherein the thickness of the primer layer is between about 30 Å and about 2 μm.

5. The process of claim 1, wherein the thickness of the primer layer is between about 30 Å and about 300 Å.

6. The process of claim 1, wherein the diluent silane is selected from the group consisting of tetraethylorthosilicate and 3-aminopropyltriethoxysilane.

7. The process of claim 1, wherein the free radical polymerizable silane is selected from the group consisting of 3-acryloxypropyltriethoxysilane, 3-acryloxypropyltrimethoxysilane, 3-methacryloxypropyltriethoxysilane and 3-methacryloxypropyltrimethoxysilane.

8. The process of claim 7, wherein the silanes of the primer composition have at least partially condensed to form a sol.

9. The process of claim 1 wherein the mole ratio of diluent silane to free radical polymerizable silane is between 1:3 and 3:1.

10. The process of claim 1 wherein the mole ratio of diluent silane to free radical polymerizable silane is between 1:2 and 2:1.

11. A process for forming a polymer layer on a silicon wafer substrate comprising:

applying to the surface of a silicon wafer substrate a thin film of a primer composition which comprises a diluent silane compound of formula (I):

$$R_dSi(OR_1)(OR_2)(OR_3) \qquad (I)$$

wherein $R_d$ comprises an organic non-polymerizable moiety, and $R_1$, $R_2$, and $R_3$ are independently selected from the group consisting of H, halogen, $C_1$ to $C_{10}$ alkyl, $C_6$ to $C_{14}$ aryl, and a silicate network;

and a free radical-polymerizable silane compound of formula (II)

$$R_eSi(OR_4)(OR_5)(OR_6) \qquad (II)$$

wherein $R_e$ comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network;

wherein the mole ratio of diluent silane to free radical polymerizable silane is between 1:9 and 9:1;

at least partially condensing the diluent silane and the free radical polymerizable silane to form a silicate network, thereby forming a primed substrate having a condensed primer layer covalently bonded to the substrate, the surface of the primer layer having reactive free radical polymerizable moieties;

applying to the surface of the primer layer an energy curable composition; and polymerizing the energy curable composition, thereby forming a polymer layer, the polymer layer forming covalent bonds to the primer layer;

wherein the energy curable composition comprises a free radical-polymerizable monomer or oligomer and a photoinitiator and wherein the energy curable composition is polymerized by exposure to actinic radiation.

12. The process of claim 11, wherein the step of at least partially condensing the silanes is performed by heating at a temperature between about 70° C. and about 140° C. for up to about 2 hours.

13. The process of claim 11, wherein the energy curable composition comprises a fluorinated acrylate compound.

14. A layered structure comprising:
(a) a silicon wafer substrate and
(b) an at least partially condensed primer layer deposited on the substrate, the primer layer comprising:
a diluent silane compound of formula (I):

$$R_dSi(OR_1)(OR_2)(OR_3) \qquad (I)$$

wherein $R_d$ comprises an organic non-polymerizable moiety, and $R_1$, $R_2$, and $R_3$ are independently selected from the group consisting of H, halogen, $C_1$ to $C_{10}$ to alkyl, $C_6$ to $C_{14}$ aryl, and a silicate network;
and a free radical-polymerizable silane compound of formula (II):

$$R_eSi(OR_4)(OR_5)(OR_6) \qquad (II)$$

wherein $R_e$, comprises a free radical-polymerizable moiety, $R_4$, $R_5$ and $R_6$ are independently selected from the group consisting of H, halogen, $C_1$ to $C_{10}$ alkyl, $C_6$ to $C_{14}$ aryl, and a silicate network;

wherein the mole ratio of diluent silane to free radical polymerizable silane is between 1:9 and 9:1.

15. The layered structure of claim 14, wherein the reactive polymerizable moieties of the primer layer are substantially unreacted after storage at room temperature for 1 day.

16. The process of claim 15, wherein the reactive free radical polymerizable moieties of the layer are substantially unreacted after storage at room temperature for 3 days.

17. The layered structure of claim 14, further comprising a cured polymeric material deposited on the primer layer, the cured polymeric material forming covalent bonds with the primer layer.

18. The layered structure of claim 17, wherein the cured polymeric material is a fluorinated polymer.

* * * * *